(No Model.)
S. E. BARTON.
COMBINED DESK RULE AND BALANCE.
No. 243,753. Patented July 5, 1881.
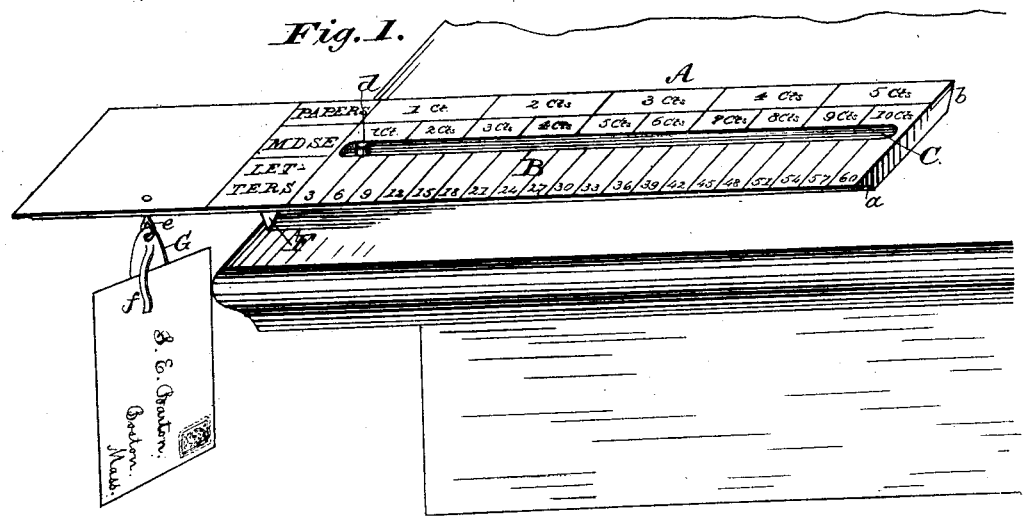
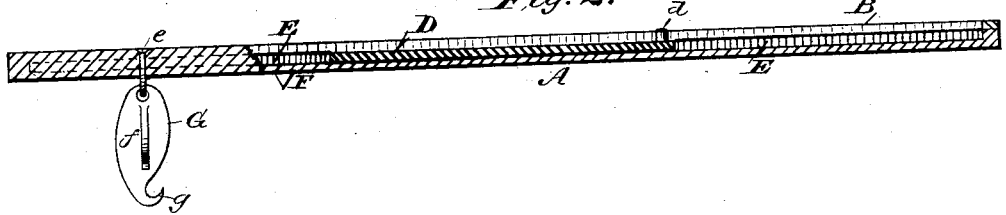
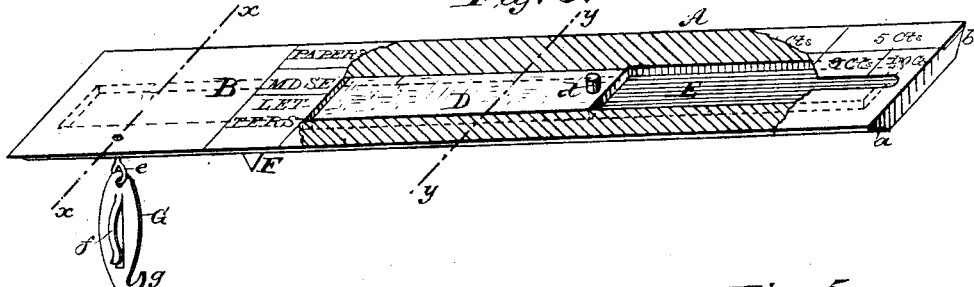
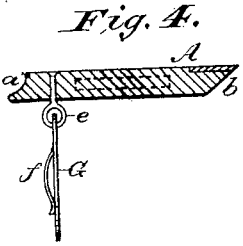
Witnesses:
L. P. Haskell
Clara Barton
Inventor:
Stephen E. Barton

UNITED STATES PATENT OFFICE.

STEPHEN E. BARTON, OF BOSTON, MASSACHUSETTS.

COMBINED DESK-RULE AND BALANCE.

SPECIFICATION forming part of Letters Patent No. 243,753, dated July 5, 1881.

Application filed March 10, 1881. (No model.)

*To all whom it may concern:*

Be it known that I, STEPHEN E. BARTON, a citizen of the United States, residing at Boston, in the county of Suffolk and State of Massachusetts, have invented certain new and useful Improvements in Combined Rules and Scales; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to combined rules and scales, and the object is to improve the construction and utility of such rules and scales, so as to make them more accurate and perfect when in use as a postal scale and desk-ruler, and is intended as an improvement on the Corser patent, issued July 13, 1880.

The invention consists in the construction and arrangement of parts, as will be more fully described hereinafter, reference being had to the accompanying drawings, and the letters of reference thereon.

In the drawings, Figure 1 is a perspective view of my combined rule and scale in position for weighing a letter. Fig. 2 is a vertical longitudinal section of the same. Fig. 3 is a perspective view, partly in section, showing the weight and the groove for it. Fig. 4 is a cross-section on line $x\,x$. Fig. 5 is a cross-section on line $y\,y$. Fig. 6 is an enlarged sectional view of the hook.

In the drawings, A is the rule or ruler having its one edge, $a$, rounded out and the other edge, $b$, beveled off, so as to form a paper-cutter. The rule A is made hollow, and has its upper side or cover, B, slotted, as shown at C, for the passage of a pin, $d$, on a sliding weight, D, made of any suitable material. This weight fits loosely in the groove E, formed in the rule, and is moved backward and forward by the pin $d$. On the upper side of the rule is a scale, marked with the proper amounts required for postage for letters or other mailable matter, and marked in multiples of three cents; and if the pin of the sliding weight rests—when balancing, for instance—between the two marks between which are the words "nine cents," any one will know that nine cents postage is required. Papers and other matter of the third class, as also merchandise or matter of the fourth class, are designated by other additional scales designated on the rule. The ounces and fractions of ounces and pounds may also be designated, so that any one can see at a glance the weight of any article, as well as the amount of postage required. On the reverse or under side of the rule may be placed the usual scale of inches, (or other scales, as desired,) so that it may be used in the same manner as an ordinary measuring-rule. The sides and outlines are made true, so that it may be used for drawing or ruling straight lines, as ordinary rulers are used. On the lower side, at a precise point, when the article is to be used as a balance, there is a small transverse bar, F, or its equivalent, preferably of V shape, so as to form a knife-edge, upon which the scale rests and forms a fulcrum or pivot.

The several parts are so arranged and adjusted that when the weight D is moved backward as far as it will run a minimum of its weighing capacity of one-half ounce is made, so that with the weight D pushed to the extreme left hand, any article being attached to the scale in position for weighing, if the scale is not tipped by the weight of the article, any one may know that the article does not weigh more than one-half ounce, and consequently, if a letter or other first-class matter, it requires but a single or minimum rate of postage. As a large proportion of letters for the mails do not weigh more than one-half ounce, the convenience of this minimum point will be obvious, as no care is needed in placing the weight in position for ascertaining if a letter be more than a minimum weight or not. On the lower side, toward the left-hand end of the rule, is secured, at a precise point, which is ascertained by testing and adjusting, a hook, G, of peculiar construction, by a staple or eye-hook, $e$. The hook consists of a flat piece of metal having a tongue, $f$, punched out and bent, as best shown in Fig. 6, and this forms a spring for holding letters, &c., between the lower edge, as shown in Fig. 1. Other articles—such as bundles or similar things—may be suspended from the lower end, which forms a hook, $g$.

The operation is as follows: When any letter, paper, or other article is to be weighed, the rule is placed near the edge of the table, desk, or other support and rests on the fulcrum, so that the left-hand end projects beyond the table, &c. The letter is then pushed between the tongue of the hook and held by it until the proper amount of postage is ascertained by moving the sliding weight until it exactly balances the letter. If the letter weighs less than one-half ounce, a balance cannot be made, as a minimum is established at that point.

If other articles, bundles, &c., which are too thick for the tongue, are to be weighed, they can be suspended from the hook $g$.

I am aware that a combined rule and balance provided with a sliding weight, and upon which rule letters, &c., have been laid upon one end on the upper side, is not new; but this is not very accurate, as there was no certain method provided for placing the article at the precise point required for accuracy, and I therefore do not broadly claim such; but,

Having thus described my invention, what I do claim, and desire to secure by Letters Patent, is—

1. The hook G, provided with a tongue, $f$, and hook $g$, substantially as described, and for the purpose specified.

2. In combination with a postal scale, the hook G, provided with a tongue, $f$, and hook $g$, and secured by a staple or eye-hook, $e$, as and for the purpose herein specified.

3. In combination with a combined scale and rule, as described, the hook G, provided with a tongue, $f$, and hook $g$, and secured at a precise point by a staple or eye-hook, $e$, when constructed and arranged as and for the purpose set forth.

4. In postal scales, the sliding weight D, arranged so as to be stopped at a minimum point of its weighing capacity of one-half ounce, substantially as specified.

In testimony whereof I affix my signature in presence of two witnesses.

STEPHEN E. BARTON.

Witnesses:
 GEO. F. GRAHAM,
 JOSEPH E. HOLMES.